United States Patent
Tanikawa et al.

(10) Patent No.: US 6,226,865 B1
(45) Date of Patent: May 8, 2001

(54) METHOD OF CONNECTING COVERED WIRES

(75) Inventors: Satoshi Tanikawa; Takashi Ishii, both of Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/274,975

(22) Filed: Mar. 23, 1999

(30) Foreign Application Priority Data

Mar. 25, 1998 (JP) .................................................. 10-077770

(51) Int. Cl.⁷ .................................................. H01R 43/00
(52) U.S. Cl. .............................. 29/872; 29/868; 174/84 R
(58) Field of Search .............................. 29/858, 859, 860, 29/868, 872; 174/84 R, 87, 94 R

(56) References Cited

U.S. PATENT DOCUMENTS 5,584,122  12/1996  Kato et al. .

FOREIGN PATENT DOCUMENTS 0 834 956 A2   9/1997 (EP) .
7 320842      12/1995 (JP) .

OTHER PUBLICATIONS

U.K. Search Report dated Jun. 15, 1999.

*Primary Examiner*—Lee Young
*Assistant Examiner*—Minh Trinh
(74) *Attorney, Agent, or Firm*—Finnegan, Henderson, Farabow, Garrett & Dunner, L.L.P.

(57) ABSTRACT

In this method, a ground wire 2 is overlaid on a shield wire 1 in cross. Next, overlapping portions of the shield wire 1 and the ground wire 2 are interposed between an upper resin tip 13 and a lower resin tip 14. By executing a first ultrasonic oscillation while inserting a projection 7a of an ultrasonic horn 7 into a through hole 13b of the tip 13, outside rinds 1d, 2b of the wires 1, 2 are removed in the vicinity of the overlapping portions. Next, by arranging a low-melting metal 15 and a resin piece 16 on a contact between the braided wire 1c and the core line 2a and executing a second ultrasonic oscillation, the contact can be brazed with the mutual welding of the tips 13, 14.

2 Claims, 5 Drawing Sheets

METHOD OF CONNECTING COVERED WIRES

BACKGROUND OF THE INVENTION

1. Field of the Invention

The present invention relates to a method of connecting covered wires, by which respective conductors of the covered wires can be connected to each other by making use of internal heating of the wires brought by ultrasonic oscillation. More particularly, it relates to a connecting method for covered wires, which is effective to connect a shield wire with a ground wire.

2. Description of the Related Art

Generally, it is complicated and troublesome to handle a shield wire having a braided wire coaxially disposed around a core line (or core lines) with the deteriorated workability in using the shield wire. As an effective measure for improving the deteriorated workability, there is provided a connecting structure for wires which takes advantage of inside heating due to the ultrasonic oscillation by Japanese Unexamined Patent Publication (kokai) No. 7-320842.

In the publication, there are shown two kinds of covered wires. One is a shield wire which comprises a core line, an inside insulating rind arranged outside the core line, a braided wire as a shield conductor arranged outside the inside insulating rind, and an outside insulating rind. The other is a ground wire consisting of a core line and an outside resinous rind arranged outside the core line.

According to the disclosed method, in order to connect the braided wire of the shield wire with the core line of the ground wire in front of the connector, the shield wire and the ground wire being both connected to a connector, the ground wire is firstly overlaid on the shield wire so as to cross each other at a connection point. Next, the overlapping portions are interposed between upper and lower resin tips. Then, while compressing the upper and lower resin tips from the outside, they are subjected to ultrasonic oscillation by making use of an ultrasonic horn and an anvil. Consequently, both of the outside rinds of the shield wire and the ground wire are molten for elimination, so that the braided wire of the shield wire comes into electrical contact with the core line of the ground wire. Simultaneously, the upper and lower resin tips are mutually welded to each other thereby to seal up the surroundings of the above connecting point.

SUMMARY OF THE INVENTION

There is proposed a modified method of connecting the core line of the ground wire with the braided wire of the shield wire by brazing. In this modified method, a metal piece (brazing metal) capable of melting at relatively low temperature is embedded in the upper resin tip in advance of welding. And then, on condition that the shield wire and the ground wire are interposed between the upper resin tip and the lower resin tip, they are subjected to the ultrasonic oscillation. Consequently, the core line of the ground wire can be brazed to the braided wire of the shield wire through the intermediary of the metal piece molten by the ultrasonic oscillation.

It should be noted in the above method that the upper and lower resin tips used are respectively provided, on mutual butt surfaces thereof, with shallow grooves for accommodating the shield wire therein. The above metal piece is embedded in a recess in the shallow groove formed in the upper resin tip and positioned so that a top of the piece somewhat projects from a bottom of the shallow groove.

In the above-mentioned method, however, the molten metal cannot dissolve into a contact between the braided wire and the core line unless the insulating covers of the shield wire and the ground wire are not molten and removed sufficiently. That is, despite that the ultrasonic oscillation is applied on the lower resin tip and the upper resin tip having the metal piece embedded therein, there is still remained a difficulty of brazing the braided wire to the core line certainly. For this reason, the resultant structure connected in accordance with this method does exhibit wide dispersion in terms of its electrical performance after thermal shock test.

Under such a circumstance, it is therefore an object of the present invention to provide a connecting method for covered wires, which allows the above metal piece soluble at relatively low temperature, to dissolve into the circumference of a contact between conductors of the covered wires certainly.

The object of the present invention described above can be accomplished by a method for connecting conductors of covered wires to each other, the method comprising:

a first process including the steps of:
  preparing a first covered wire having a first conductor covered with an insulating cover and a second covered wire having a second conductor covered with another insulating cover;
  overlaying the second covered wire on the first covered wire so as to cross each other;
  putting overlapping portions of the first and second wires between an upper resin tip and a lower resin tip; and
  melting and removing the insulating covers of the first and second wires in the vicinity of the overlapping portions by a first ultrasonic oscillation; and a second process including the steps of:
  setting a brazing metal on a contact between the first conductor and the second conductor, the contact being exposed by removing the insulating covers of the first and second wires; and
  melting the brazing metal to braze the contact by a second ultrasonic oscillation.

According to the above-mentioned method, since the first and second conductors are brazed to each other after removing the insulating covers of the first and second wires, it is possible to melt the brazing metal into the contact of the first and second wire, sufficiently.

In the above-mentioned method, preferably, the upper resin tip is provided, at a center thereof, with a through hole and the first ultrasonic oscillation at the first process is carried out by inserting a projection of an ultrasonic horn into the through hole of the upper resin tip, thereby oscillating the overlapping portion with ultrasonic waves, directly; and the second ultrasonic oscillation at the second process is carried out by previously inserting the brazing metal into the through hole and sequentially inserting a resin piece into the through hole.

According to the preferred method, since the projection of the ultrasonic horn inserted into the through hole applies the ultrasonic oscillation on the first and second covered wires directly, it is possible to eliminate the insulating covers of the wires effectively, whereby the contact of the first and second conductors can be exposed. Furthermore, at the second step, by inserting the brazing metal and the resin piece into the through hole, the brazing metal can dissolve in the exposed contact only, so that the certain metal binding can be accomplished.

In the above-mentioned method, preferably, the first covered wire is a shield wire having a shield conductor as the first conductor, while the second covered wire is a ground wire having a core line as the second conductor.

In this case, owing to the first and second ultrasonic oscillations, it is possible to connect the shield conductor of the shield wire to the core line of the ground wire certainly.

According to the present invention, there is also provided a method for connecting conductors of covered wires to each other, the method comprising:

a first process including the steps of:
preparing a first covered wire having a first conductor covered with an insulating cover and a second covered wire having a second conductor covered with another insulating cover;
overlaying the second covered wire on the first covered wire so as to cross each other;
putting overlapping portions of the first and second wires between an upper resin tip and a lower resin tip; and
melting and removing the insulating covers of the first and second wires in the vicinity of the overlapping portions by a first ultrasonic oscillation; and a second process including the steps of:
setting a brazing metal on a contact between the first conductor and the second conductor, the contact being exposed by removing the insulating covers of the first and second wires; and
applying a second ultrasonic oscillation on the upper and lower resin tips while pressurizing them from the outside, thereby melting the brazing metal to braze the contact and also mutually welding the upper and lower resin tips to each other to seal up the circumference of the contact by the welded resin tips.

Also in the above method, after removing the insulating covers of the first and second wires, the first and second conductors are brazed to each other through the brazing metal. Thus, it is possible to melt the brazing metal into the contact of the first and second wire, sufficiently.

According to the present invention, there is also provided a method for connecting conductors of covered wires to each other, the method comprising:

a first process including the steps of:
preparing a first covered wire having a first conductor covered with an insulating cover and a second covered wire having a second conductor covered with another insulating cover;
overlaying the second covered wire on the first covered wire so as to cross each other;
putting overlapping portions of the first and second wires between an upper resin tip and a lower resin tip; and
applying a first ultrasonic oscillation on the upper and lower resin tips, thereby melting and removing the insulating covers of the first and second wires in the vicinity of the overlapping portions and also mutually welding the upper and lower resin tips to each other to seal up the circumference of the overlapping portions by the welded resin tips; and a second process including the steps of:
setting a brazing metal on a contact between the first conductor and the second conductor, the contact being exposed by removing the insulating covers of the first and second wires; and
melting the brazing metal to braze the contact by a second ultrasonic oscillation.

Also in the above method, after removing the insulating covers of the first and second wires, the first and second conductors are brazed to each other through the brazing metal. Thus, it is possible to melt the brazing metal into the contact of the first and second wire, sufficiently.

These and other objects and features of the present invention will become more fully apparent from the following description and appended claims taken in conjunction with the accompany drawings.

BRIEF DESCRIPTION OF THE DRAWINGS

FIG. 1A is a perspective view showing the overall arrangement and FIG. 1B is a cross sectional view taken along a line of IB—IB of FIG. 1A;

FIG. 2A is a perspective view of an upper resin tip turned over, FIG. 2B is a perspective view of a lower resin tip and FIG. 2C is a cross sectional view taken along a line IIC—IIC of FIG. 2A;

FIG. 3A is a perspective view of the connecting structure and FIG. 3B is a cross sectional view taken along a line IIIB—IIIB of FIG. 3A;

FIG. 4A is a perspective view showing the overall arrangement and FIG. 4B is a cross sectional view taken along a line of IVB—IVB of FIG. 4A; FIG. 5A is a perspective view of the connecting structure and FIG. 5B is a cross sectional view taken along a line VB—VB of FIG. 5A.

DESCRIPTION OF THE PREFERRED EMBODIMENT

U.S. Pat. No. 5,584,122, Kato et al., issued on Dec. 17, 1996 is characterized by reference herein in its entirety. Embodiments of the present invention will be described with reference to the accompanying drawings.

The connecting method of the embodiment comprises the first step of executing the first ultrasonic oscillating and the second step of executing the second ultrasonic oscillating while a low-melting metal (brazing metal) and a resin piece are disposed into resin tips.

Figure 1A:
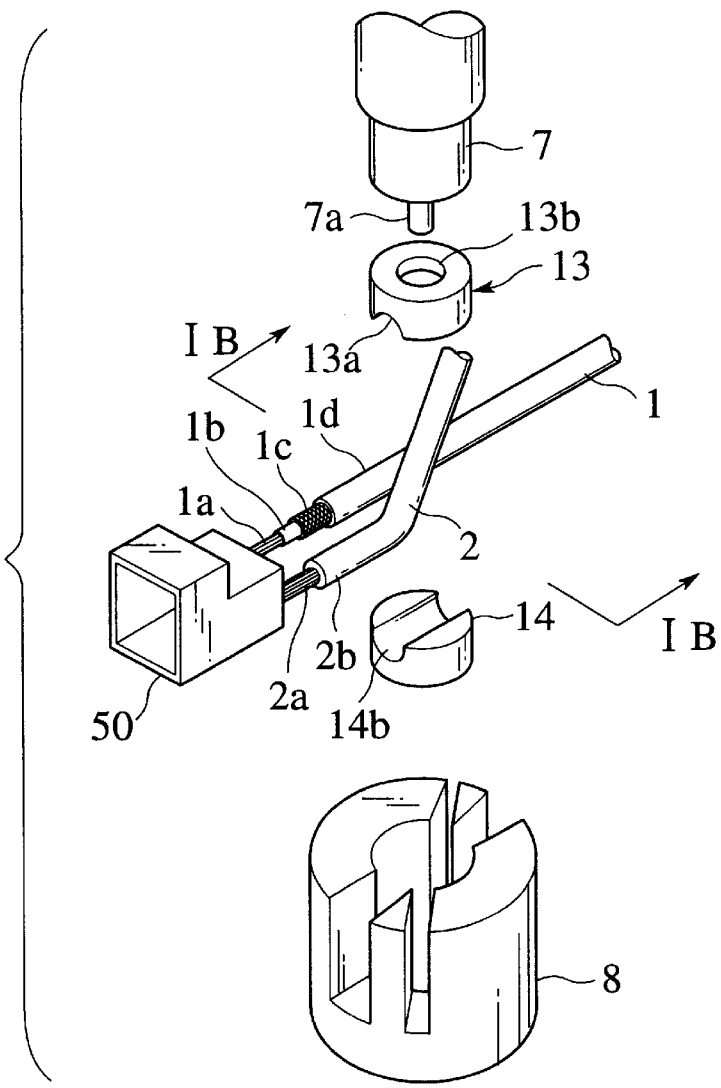
FIGS. 1A and 1B are views showing the first step of a connecting method in accordance with an embodiment of the present invention.
Figure 1B:
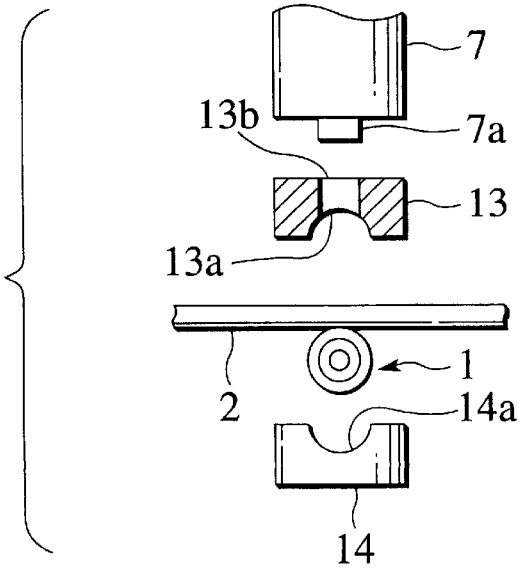
Figure 2A:
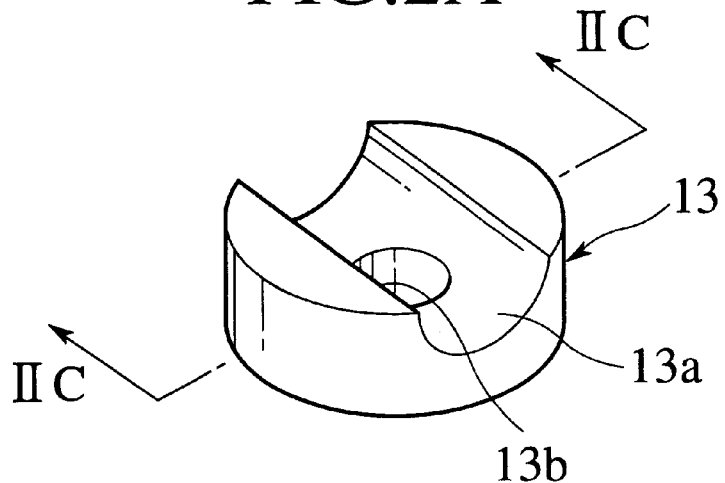
FIGS. 2A to 2C show resin tips used in the connecting method of the embodiment.
Figure 2B:
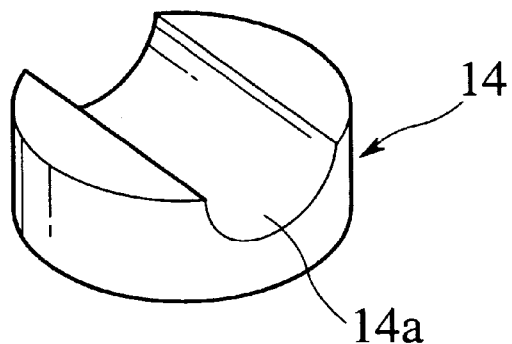
Figure 2C:
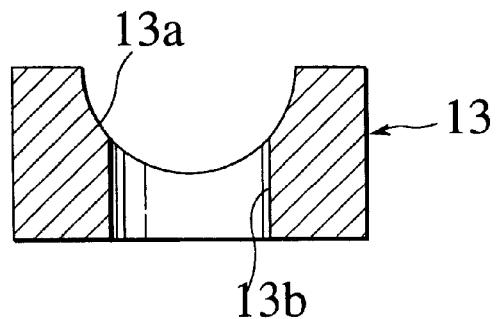

FIGS. 1A and 1B are views for explanation of the first step of the connecting method. In the figures, FIG. 1A is a perspective view showing the overall arrangement and FIG. 1B is a cross sectional view taken along a line of IB—IB of FIG. 1A. FIGS. 2A to 2C show the structure of resin tips adopted in the connecting method. FIG. 2A is a perspective view of an upper resin tip 13 turned over. FIG. 2B is a perspective view of a lower resin tip 14. FIG. 2C is a cross sectional view taken along a line IIC—IIC of FIG. 2A.

As shown in FIGS. 2A to 2C, the upper and lower resin tips 13, 14 are in the form of circular plates, respectively. On respective butt faces (i.e. mutual contact faces being welded) of the upper and lower resin tips 13, 14, wire receiving grooves 13a, 14a are formed so as to extend in the diametrical direction of the tips 13, 14 and have semi-circular cross sections. Each of the wire receiving grooves 13a, 14a of the tips 13, 14 has a diameter so as not to oppress an outside rind 1d of a shield wire 1 so forcibly. In other words, each receiving grooves 13a, 14a has a diameter substantially equal to the outer diameter of the outside rind 1d. Further, the upper resin tip 13 is provided, at a center thereof, with a circular through hole 13b.

As shown in FIG. 1, at the first step, a horn 7 is used as an ultrasonic horn performing the ultrasonic welding. The horn 7 is provided, at a leading end thereof, with a projection 7a in the form of a small column. The shield wire 1 further includes a core line 1a connected to a connector 50, an inside rind 1b covering the core line 1a and a braided wire 1c arranged about the inside rind 1b. On the other hand, a ground line 2 comprises a core line(s) 2a also connected to the connector 50 and an outside rind 2b covering the core line 2a.

In order to connect the braided wire 1c of the shield wire 1 to the core line 2a of the ground wire 2 in front of the connector 50, it is firstly executed to overlay the ground line 2 on the shield wire 1 so as to cross each other at a connection point. Next, it is executed to put the overlapping portions of the wires 1, 2 between the upper resin tip 13 and the lower resin tip 14 and further between the ultrasonic horn 7 and an anvil 8. And then, the projection 7a of the ultrasonic horn 7 is inserted into the through hole 13b of the upper resin tip 13 and thereafter, the overlapping portions of the wires 1, 2 and the upper and lower resin tips 13, 14 are oscillated with ultrasonic waves by the ultrasonic horn 7, directly.

Figure 3A:
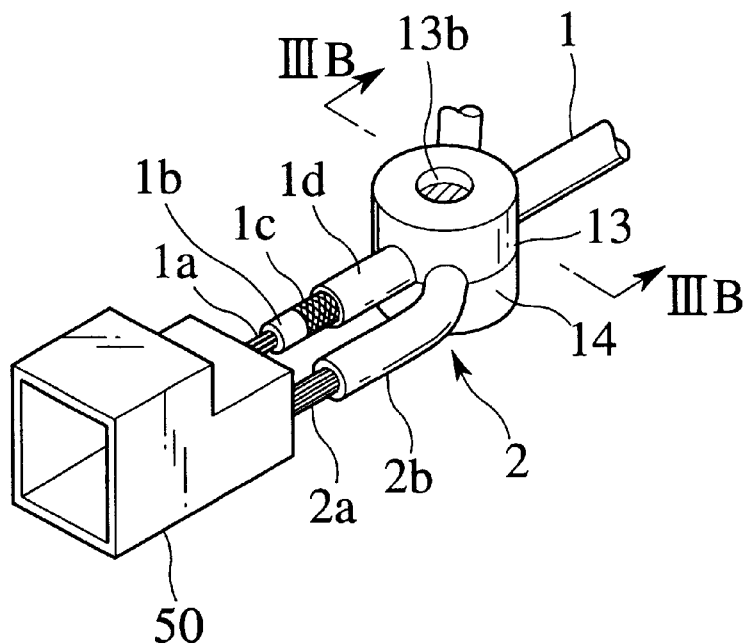
FIGS. 3A and 3B are views showing a connecting structure after completing the first step of the connecting method.
Figure 3B:
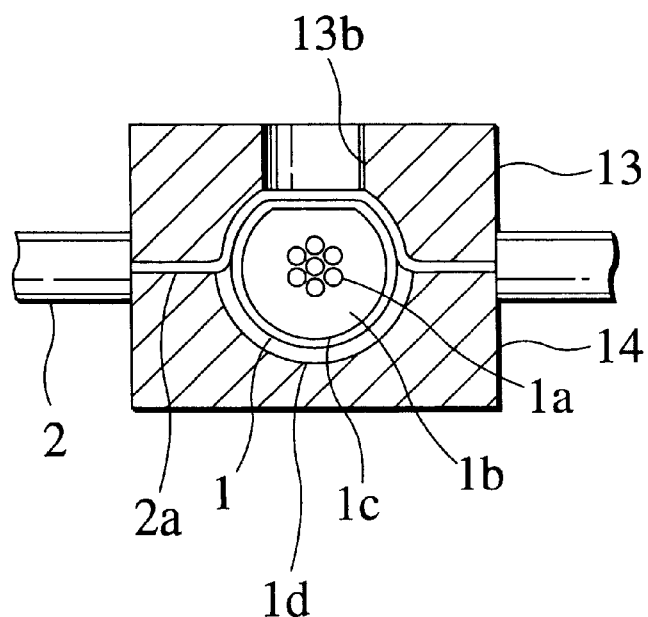

By this ultrasonic oscillation, the outside rind 1d of the shield wire 1 and the outside rind 2b of the ground wire 2 are molten for removal, effectively. Consequently, it can be obtained a connecting structure as shown in FIGS. 3A and 3B, where the contact between the braided wire 1c of the shield wire 1 and the core line 2a of the ground wire 2 is exposed to the outside through the through hole 13b. At this stage, the butt faces of the upper and lower resin tips 13, 14 are molten and welded with each other.

Figure 4A:
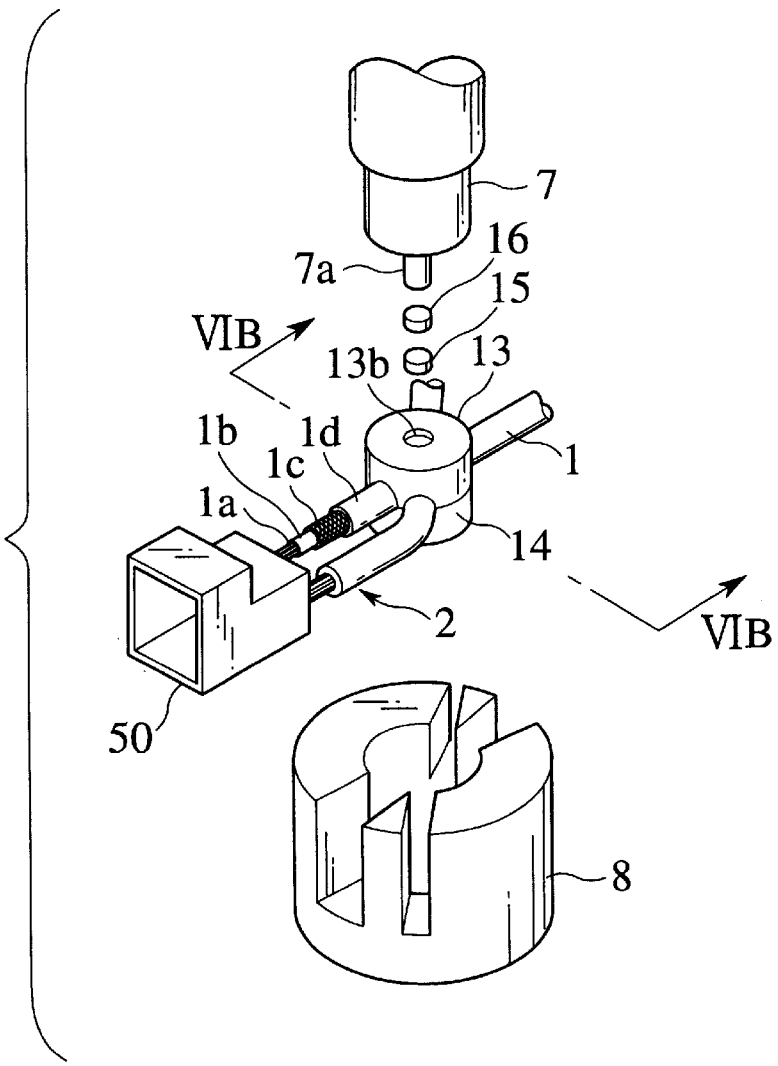
FIGS. 4A and 4B are views showing the second step of the connecting method in accordance with the embodiment of the present invention.
Figure 4B:
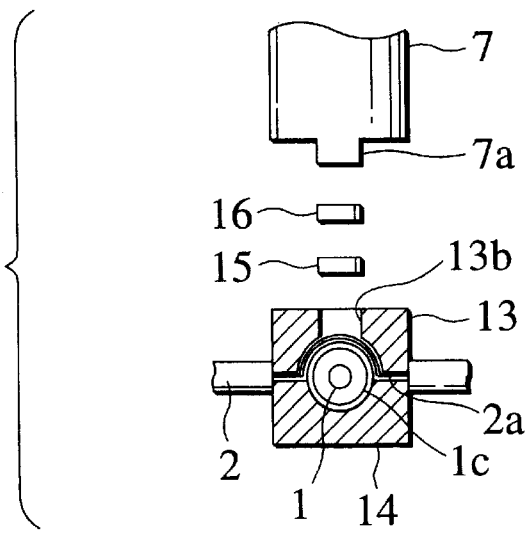
Figure 5A:
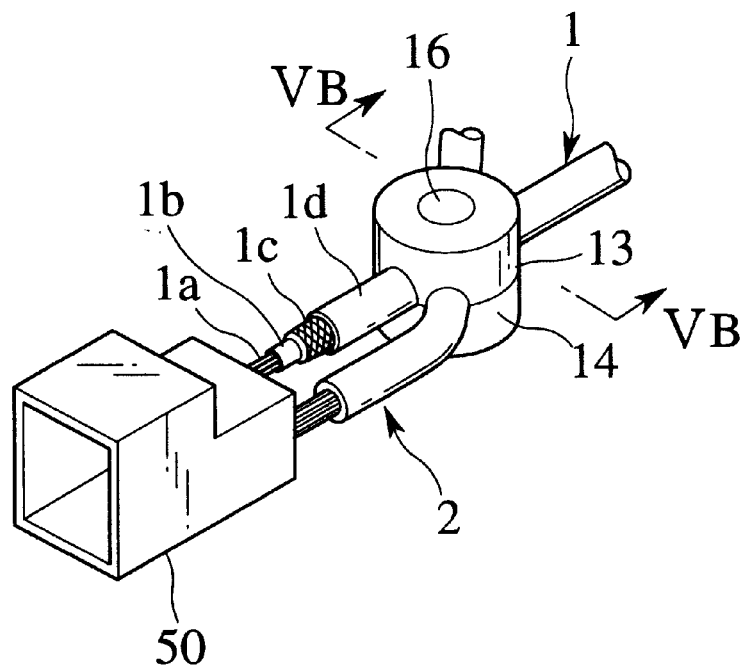
FIGS. 5A and 5B are views showing the connecting structure after completing the second step of the connecting method.
Figure 5B:
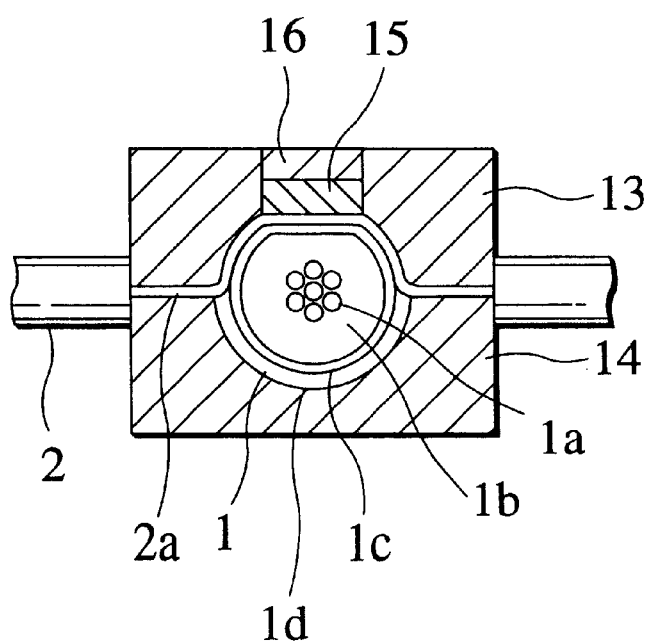

Next, at the second step, a low-melting metal 15 (small piece) and a resin piece 16 in succession are inserted into the through hole 13b, as shown in FIGS. 4A and 4B. Moreover, from the upper side of the resin tip 13, the ultrasonic oscillation is applied on the metal 15 and the resin piece 16 in the through hole 13b, by the ultrasonic horn 7. Consequently, the contact between the braided wire 1c and the core line 2a is brazed by the molten low-melting metal 15. At the same time of brazing, the resin piece 16 on the contact is molten and welded to the upper resin tip 13 to seal up the contact. In this way, the connecting structure of the shield wire 1 and the ground wire 2 can be completed.

According to the method, both of the outside rinds 1d, 2b of the shield wire 1 and the ground wire 2 can be removed by the first ultrasonic oscillation and thereafter, the low-melting metal 15 is molten into the exposed contact between the shield wire 1 and the ground wire 2 by the second ultrasonic oscillation. Therefore, it is possible to melt the low-melting metal 15 into the contact sufficiently, whereby the bonding of metals can be accomplished.

Finally, it will be understood by those skilled in the art that the foregoing description is related to one preferred embodiment of the disclosed connecting method, and that various changes and modifications may be made to the present invention without departing from the spirit and scope thereof. For example, in connection with the above-mentioned embodiment, the upper and lower resin tips 13, 14 may be welded to each other at the same time of oscillating the resin piece 16 with ultrasonic waves.

What is claimed is:

1. A method for connecting conductors of covered wires to each other, the method comprising:

a first process including the steps of:
      preparing a first covered wire having a first conductor covered with an insulating cover and a second covered wire having a second conductor covered with another insulating cover;
      overlaying the second covered wire on the first covered wire so as to cross each other;
      putting overlapping portions of the first and second wires between an upper resin tip and a lower resin tip, the upper resin tip being provided, at a center thereof, with a through hole; and
      melting and removing the insulating covers of the first and second wires in the vicinity of the overlapping portions by applying a first ultrasonic oscillation by inserting a projection of an ultrasonic horn into the through hole of the upper resin tip, thereby oscillating the overlapping portion with ultrasonic waves, directly; and a second process including the steps of:
      setting a brazing metal on a contact between the first conductor and the second conductor, the contact being exposed by removing the insulating covers of the first and second wires; and
      melting the brazing metal to braze the contact by a second ultrasonic oscillation carried out by previously inserting the brazing metal into the through hole and sequentially inserting a resin piece into the through hole.

2. A method of connecting conductors of covered wires to each other, the method comprising:

a first process including the steps of:
      preparing a first covered wire having a first conductor covered with an insulating cover and a second covered wire having a second conductor covered with another insulating cover;
      overlaying the second covered wire on the first covered wire so as to cross each other;
      putting overlapping portions of the first and second wires between an upper resin tip and a lower resin tip, the upper resin tip being provided, at a center thereof, with a through hole; and
      applying a first ultrasonic oscillation on the upper and lower resin tips by inserting a projection of an ultrasonic horn into the through hole of the upper resin tip, thereby oscillating the overlapping portion with ultrasonic waves, directly, and thereby melting and removing the insulating covers of the first and second wires in the vicinity of the overlapping portions and also mutually welding the upper and lower resin tips to each other to seal up the circumference of the overlapping portions by the welded resin tips; and a second process including the steps of:
      setting a brazing metal on a contact between the first conductor and the second conductor, the contact being exposed by removing the insulating covers of the first and second wires; and
      melting the brazing metal to braze the contact by a second ultrasonic oscillation carried out by previously inserting the brazing metal into the through hole and sequentially inserting a resin piece into the through hole.

\* \* \* \* \*